United States Patent
Burton et al.

(10) Patent No.: US 9,868,642 B2
(45) Date of Patent: Jan. 16, 2018

(54) SYNTHESIS OF DDR FRAMEWORK-TYPE MOLECULAR SIEVES

(71) Applicants: Allen W. Burton, Stewartsville, NJ (US); Eugene Terefenko, Center Valley, PA (US)

(72) Inventors: Allen W. Burton, Stewartsville, NJ (US); Eugene Terefenko, Center Valley, PA (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 260 days.

(21) Appl. No.: 14/920,037

(22) Filed: Oct. 22, 2015

(65) Prior Publication Data

US 2016/0145112 A1 May 26, 2016

Related U.S. Application Data

(60) Provisional application No. 62/082,210, filed on Nov. 20, 2014.

(51) Int. Cl.
| | | |
|---|---|---|
| *C01B 39/48* | (2006.01) | |
| *C01B 37/02* | (2006.01) | |
| *C01B 37/00* | (2006.01) | |
| *C01B 39/12* | (2006.01) | |

(52) U.S. Cl.
CPC ............ *C01B 39/48* (2013.01); *C01B 37/007* (2013.01); *C01B 37/02* (2013.01); *C01B 39/12* (2013.01)

(58) Field of Classification Search
CPC ....... C01B 37/02; C01B 37/007; C01B 39/12; C01B 39/48
See application file for complete search history.

(56) References Cited

U.S. PATENT DOCUMENTS

| | | | | |
|---|---|---|---|---|
| 4,698,217 A * | 10/1987 | Valyocsik | ................ | B01J 29/70 423/277 |
| 4,752,378 A * | 6/1988 | Valyocsik | ................ | B01J 29/70 208/108 |
| 5,200,377 A * | 4/1993 | Zones | ................... | B01J 29/04 423/326 |
| 7,014,680 B2 | 3/2006 | Nakayama et al. | | |
| 9,365,431 B2 * | 6/2016 | Johnson | ................ | B01D 53/04 |
| 9,573,116 B2 * | 2/2017 | Johnson | ................ | B01D 53/02 |
| 2009/0111959 A1 | 4/2009 | Cao et al. | | |

FOREIGN PATENT DOCUMENTS

| | | | |
|---|---|---|---|
| EP | 0195498 A2 * | 9/1986 | ......... C01B 33/2876 |
| EP | 0193282 A2 | 4/2009 | |
| WO | 9829339 A1 | 7/1998 | |

OTHER PUBLICATIONS

Van Den Bergh et al., "Modeling the Loading Dependency of Diffusion in Zeolites: the Relevant Site Model Extended to Mixtures in DDR-Type Zeolite", Journal of Physical Chemistry C, Nov. 11, 2009, pp. 21856-21865, vol. 113, iss. 52, ACS Publications.
Jee et al., "Carbon Dioxide and Methane Transport in DDR Zeolite: Insights from Molecular Simulations into Carbon Dioxide Separations in Small Pore Zeolites", Journal of the American Chemical Society, May 7, 2009, pp. 7896-7904, vol. 131, iss. 22, ACS Publications.
Zhu et al., "Shape Selectivity in Adsorption on the All-Silica DD3R", Langmuir, Feb. 16, 2000, pp. 3322-3329, vol. 68, iss. 7, ACS Publications.
Tomita et al., "Gas separation characteristics of DDR type zeolite membrane", Microporous and Mesoporous Materials, Mar. 8, 2004, pp. 71-75, ScienceDirect.
Grünewald-Lüke et al., "Quinuciidine derivatives as structure directing agents for the synthesis of boron containing zeolite", Journal of Material Chemistry, Jul. 7, 1999, pp. 2529-2536, vol. 9, iss. 10, Royal Society of Chemistry.
Stewart et al., "Synthesis and Characterisation of Crystalline Aluminosilicate Sigma-1", Studies in Surface Science and Catalysis, 1938, pp. 57-64, vol. 37, ScienceDirect.
Eirnst et al., "Synthesis and Characterization of B-, Al-, Ga- and Fe-Silicates with the ZSM-58 Framework", Zeolites for the Nineties: Recent Research Reports, Jul. 10, 1989, pp. 55-56, 8th International Zeolite Conference, Amsterdam.
Gies, "Crystal structure of deca-dodecasil 3R, the missing link between zeolits and clathrasils", Zeitschrift für Kristallographie, Nov. 19, 1985, pp. 93-104, vol. 175, R. Oldenbourg Verlag. Münche, 1986.
Camblor et al., "Synthesis of nanocrystalline zeolite Beta in the absence of alkali metal cations", Progress in Zeolite and Microporous Materials, Studies in Surface Science and Catalysis, Jan. 1, 1997, pp. 341-348, vol. 105, Elsevier Science B.V.
PCT/US2015/056853 International Search Report and Written Opinion dated Jan. 25, 2016.

* cited by examiner

*Primary Examiner* — David M Brunsman

(57) ABSTRACT

A process for synthesizing a DDR framework-type molecular sieve comprises crystallizing a reaction mixture comprising water, a source of silicon, and a structure directing agent, Q, selected from the group consisting of a methyltropinium salt, a 2,6,N,N-tetramethylpiperidinium salt, a 2,N,N-trimethylpiperidinium salt and mixtures thereof, wherein the reaction mixture has a molar ratio of water to silicon from 5 to 80 and a molar ratio of alkali or alkaline earth metal, M, to silicon less than 0.01.

14 Claims, 11 Drawing Sheets

SYNTHESIS OF DDR FRAMEWORK-TYPE MOLECULAR SIEVES

CROSS-REFERENCE TO RELATED APPLICATIONS

This application claims the benefit of provisional U.S. Ser. No. 62/082,210, filed Nov. 20, 2014, the entire contents of which are expressly incorporated by reference herein.

FIELD OF THE INVENTION

This invention relates to the synthesis of DDR framework-type molecular sieves and their use in sorptive and catalytic applications.

BACKGROUND OF THE INVENTION

Molecular sieves are classified by the Structure Commission of the International Zeolite Association according to the rules of the IUPAC Commission on Zeolite Nomenclature. According to this classification, framework-type zeolites and other crystalline microporous molecular sieves, for which a structure has been established, are assigned a three letter code and are described in the Atlas of Zeolite Framework Types, 6th edition, Elsevier, London, England (2007). Deca-dodecasil 3R is one of the molecular sieves for which a structure has been established and materials of this framework type are designated as DDR.

DDR framework-type molecular sieves have pores which are defined by intersecting channels formed by 8-membered rings of tetrahedrally coordinated atoms and which have cross sectional dimensions of ~3.6 Å by ~4.4 Å. DDR framework-type zeolites can therefore be potentially useful in sorptive separations, for example of methane from carbon dioxide, and in catalyzing chemical reactions, including the conversion of oxygenates to olefins (OTO), where small pore size is desirable.

One example of a DDR framework-type molecular sieve is ZSM-58. U.S. Pat. No. 4,698,217 describes a method for synthesizing ZSM-58 having a silica to alumina molar ratio of 50 to 1000 using a methyltropinium salt as the directing agent.

U.S. Patent Application Publication No 2009/0111959 discloses the synthesis of a DDR framework-type molecular sieve having a composition, in its calcined, anhydrous form, involving the molar relationship $(n)X_2O_3:YO_2$, wherein X is a trivalent element, Y is a tetravalent element and n is from 0 to less than 0.01 and wherein the crystals of said material have an average diameter less than or equal to 2 microns. The material is synthesized in a fluoride-containing medium in the presence of an N-ethyltropanium compound as directing agent.

To date, DDR-type molecular sieves are relatively underdeveloped, partly because of the high cost of their synthesis, especially the structure directing agent, and partly because of the difficulty of controlling the size and uniformity of the crystals produced. For example, for kinetically selective separation processes, it is desirable that molecular sieve crystals employed as the sorbent have a large crystal size and a narrow crystal size distribution. However, many existing synthesis processes produce DDR-type crystals having a wide size distribution or crystals that are highly overgrown and/or intergrown. There is therefore a need for new process of synthesizing DDR framework-type molecular sieves of reduced cost and/or that produce larger, more uniform crystals.

SUMMARY

According to the present invention, it has now been found that, by controlling the water to silicon ratio and eliminating or minimizing alkali or alkaline earth metal cations in the reaction mixture, large and uniform crystals of DDR-framework-type molecular sieves can be synthesized in presence of methyltropinium and certain N-methylpiperidinium structure directing agents. The substantial absence of alkali or alkaline earth metal cations can also mitigate the need for ion exchange of the resultant DDR-type crystals.

Thus, in one aspect, the invention resides in a process for synthesizing a DDR framework-type molecular sieve by crystallizing a reaction mixture comprising water, a source of silicon, and a structure directing agent, Q, selected from the group consisting of a methyltropinium salt, a 2,6,N,N-tetramethylpiperidinium salt, a 2,N,N-trimethylpiperidinium salt, and mixtures thereof, wherein the reaction mixture has a molar ratio of water to silicon from 5:1 to 80:1 and a molar ratio of alkali or alkaline earth metal, M, to silicon less than 0.01:1.

DETAILED DESCRIPTION OF THE EMBODIMENTS

Figure 1:
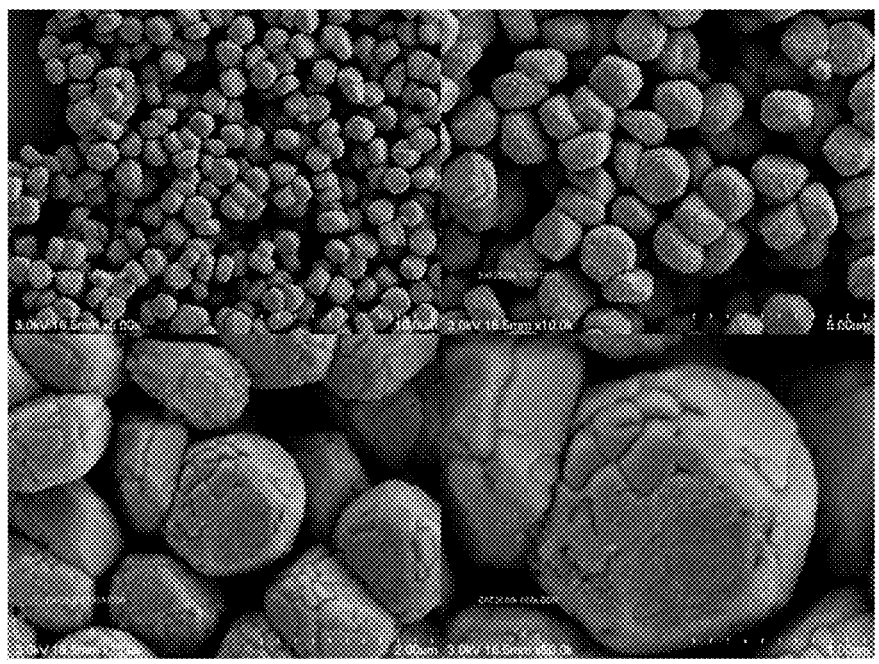
FIG. 1 shows scanning electron microscope (SEM) images of the product of Example 2.

DDR framework-type molecular sieves include a number of isotypes, including ZSM-58, Sigma-1, and/or SSZ-28. A process has now been developed of synthesizing DDR framework-type molecular sieves having a large crystal size and improved crystal morphology, including a narrow particle size distribution and/or a low level of crystal intergrowths.

The present synthesis process employs a reaction mixture comprising water, a source of silicon, and a structure directing agent, Q, such as selected from the group consisting of a methyltropinium salt, a 2,6,N,N-tetramethylpiperidinium salt, a 2,N,N-trimethylpiperidinium salt, and mixtures thereof. The reaction mixture can be substantially free of alkali or alkaline earth metal, M, such that the molar ratio of M to silicon in the reaction mixture is less than 0.01:1, such as less than 0.005:1 or advantageously approaching zero (meaning no intentionally added alkali or alkaline earth metal, M, though the possibility can still exist for there to be alkali and/or alkaline earth metal, M, as contaminant(s) in one or more of the other components of the synthesis process).

Any source of silicon can be used in the present process, such as colloidal suspensions of silica, fumed silicas, precipitated silicas, and tetraalkyl orthosilicates. Colloidal suspensions of silica can often be advantageous. In embodiments, the amount of silicon source in the reaction mixture can be such that the reaction mixture can have a molar ratio of water to silicon from 5:1 to 80:1, for example from 5:1 to 70:1, from 5:1 to 60:1, or from 7:1 to 50:1. In particular, it has been found that, by controlling the water to silicon molar ratio within these ranges, large and uniform DDR crystals can be produced from a reaction mixture substantially free of free of alkali or alkaline earth metal cations. In some embodiments, at least 90% of the mass of crystals have crystal dimensions of at least 1 micron, such as at least 5 microns and, in some embodiments, at least 10 microns. Crystal dimensions can be determined by any reasonable method, though SEM can represent a particularly convenient method, especially if the crystal dimensions are taken as an average of at least two SEM micrographs on which a one-inch scale corresponds to at least 10 microns.

In addition to all-silica DDR framework-type materials, the present process can be used to produce borosilicate materials. To produce such materials, any suitable source of boron can be added to the reaction mixture, with boric acid or boron oxide being the most convenient. Where a source of boron is present, the reaction mixture generally has a molar ratio of silica to boron oxide greater than 0.06:1, for example greater than 0.1:1, greater than 1:1, or greater than 10:1; and optionally up to 5000:1 or up to 1000:1. The silica to boron oxide ratio is used for convenience whether or not the sources of boron and silicon are boron oxide and silica, respectively—notably, this is true for silica to alumina ratios as well.

Although the reaction mixture may also include a source of alumina, in most embodiments, intentional addition of a source of alumina may be avoided, despite aluminum-containing impurities perhaps being present in trace/contaminant amounts in components of the mixture (e.g., in the source of silicon). Generally, therefore, the reaction mixture can have a molar ratio of silica to alumina greater than 150, for example greater than 300 or greater than 600, and optionally up to 10000:1, up to 5000:1, or up to 2000:1.

Methyltropinium salts, such as methyltropinium iodide, chloride, bromide, and/or hydroxide, may be used as a structure directing agent in the present synthesis and may be commercially available for purchase in sufficient purity for use as reagents. Alternatively, the methyltropinium salt may be synthesized by selective methylation of 3-tropanol at the bridgehead nitrogen. This salt can have the following formula:

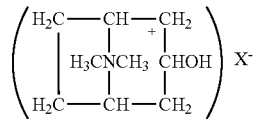

where $X^-$ is an anion, such as, for example, a halide (e.g., iodide, chloride, bromide, or the like, or a combination thereof), nitrate, hydroxide, sulfate, bisulfate, perchlorate, or the like, or a combination thereof. In some embodiments, the halide can be the chloride or the iodide.

Alternative or additional structure directing agents that can be used in the present synthesis include 2,6,N,N-tetramethylpiperidinium salts and 2,N,N-trimethylpiperidinium salts, both of which are commercially available and/or can be synthesized by exhaustive methylation of 2,6-dimethylpiperidine or 2-methylpiperidine, respectively. Again suitable salts can include a halide (e.g., iodide, chloride, bromide, or the like, or a combination thereof), nitrate, hydroxide, sulfate, bisulfate, perchlorate, or the like, or a combination thereof.

The amount of structure directing agent, Q, added to the reaction mixture can vary widely, but in most cases can be adjusted so that the molar ratio of Q to silicon in the reaction mixture can be at least 0.1:1, for example at least 0.2:1, and additionally or alternately less than 1:1, for example no more than 0.75:1. In most embodiments, the amounts of structure directing agent, Q, and water can be controlled so that the molar ratio of water to Q can be at least 10:1, for example at least 20:1 or at least 30:1, and additionally or alternately less than 200:1, for example not more than 150:1 or not more than 120:1. Examples of suitable ranges for the molar ratio of water to Q can include from 20:1 to 150:1, such as from 30:1 to 120:1.

In several embodiments, the reaction mixture for synthesis of DDR crystals can further include seeds to facilitate crystal formation. One option can be to introduce seed crystals corresponding to the desired crystal structure. Any convenient type of crystals can be used, such as dried crystals, wet crystals, or a wet cake of crystals. The seed crystals need not necessarily be processed using ion exchange or other finishing processes that would normally be applied to crystals for use in a production environment. In some embodiments, the reaction mixture may comprise up to 10 wt %, for example from about 0.05 wt % to about 5.0 wt % (e.g., from about 0.10 wt % to about 5.0 wt % or from about 1.0 wt % to about 5.0 wt %), seeds of a crystalline material comprising a DDR framework-type molecular sieve based on the total weight of silicon (measured as silica) in the reaction mixture.

In some embodiments, the reaction mixture may optionally also include one or more amines such as those selected from the group consisting of diethanolamine, triethanolamine, ethylenediamine, diethylenetriamine, and mixtures thereof. Although these materials are not believed to act as structure directing agents, the may be porogens. In any event, certain amines are believed to be capable of altering the morphology of the DDR crystals produced. Without wishing to be bound by theory, a possible explanation for this behavior can be that the amine adheres to some growing crystal faces more than others and can thereby alter the relative growth rates of the crystal edges and facets. Where such amines are present, the molar ratio of amine to structure directing agent in the reaction mixture may range from 0.15:1 to 3:1, such as from 0.5:1 to 2:1.

Crystallization of the DDR crystals can be carried out at static and/or stirred conditions in a suitable reactor vessel (e.g., in a polypropylene jar or a Teflon™-lined or stainless steel autoclave). The total useful range of temperatures for crystallization can extend from about 80° C. to about 225° C., such as from about 120° C. to about 205° C. or from about 150° C. to about 200° C. When a synthesis mixture is initially formed, the temperature of the synthesis mixture can be increased to the desired synthesis temperature in any convenient manner. For example, the temperature of the synthesis mixture can be increased by at least 10° C. per hour, for example at least 25° C. per hour, at least 40° C. per hour, or at least 75° C. per hour, until the desired synthesis temperature is achieved. Soak times at one or more temperatures may be optionally used in tandem with ramp rates to achieve an appropriate heating profile. The temperature can be maintained for a time sufficient for crystallization to occur at the temperature used, e.g., which can range from about 3 hours to about 60 days. In some embodiments, to minimize fragmentation of the DDR crystals during synthesis, it may be desirable to use slow or no stirring and to effect the crystallization at relatively high temperature for a relatively short time period.

When crystallization is approximately complete, the DDR crystals can be separated from the reaction mixture in any known manner and recovered. For example, after forming DDR crystals, the product can be filtered, washed with deionized (DI) water, and dried at a suitable temperature for removing water, such as from about 100° C. to about 140° C. However, since the reaction mixture can advantageously be substantially free of alkali and/or alkaline earth metal, there is typically no requirement to subject the crystals ion exchange or acid treatment to remove occluded alkali/alkaline earth metal cations.

The DDR crystals synthesized according to the present process can have a purity of at least about 85 wt %, e.g., at least about 90 wt %, at least about 95 wt %, or at least about 98 wt %. The purity refers to the wt % of crystals that have a DDR framework-type versus crystals having other framework-types that may be present in a crystalline product.

In some forms, DDR-type crystals can contain organic material(s) that was (were) used as the template/structure directing agent(s). Prior to use as a catalyst or adsorbent, such material can be treated to remove/decompose all or part of the organic constituent. This can be conveniently effected by heating such organic-containing crystals at a temperature from about 250° C. to about 550° C., e.g., for from 1 hour to about 48 hours.

The crystalline materials of this invention, when employed as an adsorbent and/or as a catalyst, can additionally or alternately be at least partially dehydrated. This can be done by heating to a temperature in the range from 200° C. to about 370° C. in an oxidative or inert atmosphere (such as air or nitrogen, respectively) and at atmospheric, subatmospheric, or superatmospheric pressures, e.g., for between about 30 minutes and about 48 hours. Dehydration can additionally or alternately be performed at lower temperatures, such as room temperature (~20-25° C.), merely by placing the DDR-type crystals in a vacuum, but a longer time may be required to obtain a sufficient amount of dehydration.

Optionally, the crystals can be calcined at a temperature of about 350° C. to about 925° C. for 1 to 20 minutes. To reach the calcination temperature, the temperature of the oven or other device for heating the crystals can be raised in increments of 50° C., 100° C., or another convenient increment. The crystals can be held at the incremental temperatures for a period of time prior to continuing to increase the temperature to the desired final calcination temperature. The incremental heating can allow water vapor to exit the crystal structure while reducing/minimizing damage and/or morphology changes in the crystals.

By virtue of their large and uniform size, DDR framework-type molecular sieve crystals produced by the present process can be particularly useful as sorbents, for example for selectively removing carbon dioxide from a mixture carbon dioxide and hydrocarbons such as methane. The present DDR framework-type molecular sieve crystals can additionally or alternately be useful in catalyzing chemical reactions, including the conversion of oxygenates to olefins (OTO).

Additionally or alternatively, the invention can comprise one or more of the following embodiments.

Embodiment 1

A process for synthesizing a DDR framework-type molecular sieve, the process comprising: (a) forming a reaction mixture capable of forming the molecular sieve, the mixture comprising water, a source of silicon, and a structure directing agent, Q, selected from the group consisting of a methyltropinium salt, a 2,6,N,N-tetramethylpiperidinium salt, a 2,N,N-trimethylpiperidinium salt and mixtures thereof, wherein the reaction mixture has a molar ratio of water to silicon from 5:1 to 80:1 (e.g., from 5:1 to 70:1 or from 5:1 to 60:1) and a molar ratio of alkali or alkaline earth metal, M, to silicon less than 0.01:1; (b) heating said reaction mixture under conditions effective to produce crystals of the DDR framework-type molecular sieve; and (c) recovering crystals of the DDR framework-type molecular sieve produced in (b).

Embodiment 2

The process of embodiment 1, wherein the molar ratio of water to structure directing agent, Q, in the reaction mixture is from 20:1 to 150:1.

Embodiment 3

The process of embodiment 1 or embodiment 2, wherein the molar ratio of structure directing agent, Q, to silicon in the reaction mixture is at least 0.1:1.

Embodiment 4

The process of any one of the previous embodiments, wherein the reaction mixture further comprises a source of boron.

Embodiment 5

The process of embodiment 4, wherein the reaction mixture has a molar ratio of silica to boron oxide greater than 0.06:1.

Embodiment 6

The process of any one of the previous embodiments, wherein the reaction mixture has a silica to alumina molar ratio of greater than 150.

Embodiment 7

The process of any one of the previous embodiments, wherein the source of silicon comprises colloidal silica.

Embodiment 8

The process of any one of the previous embodiments, wherein the reaction mixtures further comprises seeds (e.g., up to 10 wt %, based on total weight of silicon as silica in the reaction mixture) of a crystalline material comprising a DDR framework-type molecular sieve.

Embodiment 9

The process of any one of the previous embodiments, wherein the reaction mixture further comprises an amine selected from the group consisting of diethanolamine, triethanolamine, ethylenediamine, diethylenetriamine, and mixtures thereof.

Embodiment 10

The process of embodiment 9, wherein a molar ratio of amine to structure directing agent in the reaction mixture is from 0.15:1 to 3:1.

Embodiment 11

The process of any one of the previous embodiments, wherein the heating is conducted at a temperature from 120° C. to 205° C.

The invention will now be more particularly described with reference to the following non-limiting Examples and the accompanying drawings.

EXAMPLES

Example 1

A reaction mixture was prepared with the following mole ratios using Ludox™ AS-40 as the silicon source, NaCl as a halide source, and 2,N,N-trimethylpiperidinium hydroxide as a structure directing agent Q: Q/Si≈0.25; NaCl/Si≈0.3; $H_2O$/Si≈30

The reaction mixture was free of added sources of aluminum and boron but also contained about 1 wt % seeds, based on the total weight of silicon (as silica) in the reaction mixture. The seeds comprised a mixture of a DDR framework-type molecular sieve and an unidentified layered phase produced from an earlier crystallization (at ~160° C. for ~7 days) of an unseeded, high-silica (Si/Al ratio ~500) composition using 2,N,N-trimethylpiperidinium as the structure directing agent.

The reaction mixture was heated at about 160° C., and, after approximately three days, the product was a mixture of a DDR-type material and a layered phase. After about an additional three days of heating, the product contained only the layered phase.

Example 2

The experiment of Example 1 was repeated with the NaCl/Si ratio reduced to ~0.1:1, and, after heating at ~160° C. for about three days, a substantially pure DDR product was obtained. FIG. 1 shows SEM images of the product. The crystals appeared to be about 1.5 microns in size, but the crystal facets seemed rough and did not appear to be completely annealed.

Example 3

Figure 2:
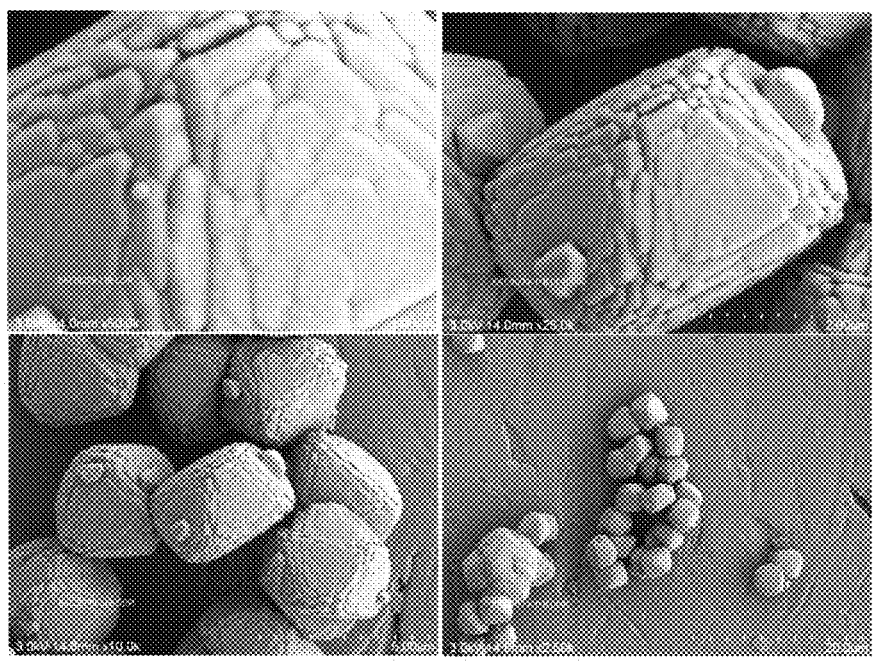
FIG. 2 shows SEM images of the product of Example 3.

The experiment of Example 1 was also repeated with no intentionally added alkali metal present. After about 4 days at ~160° C., a substantially pure DDR product was obtained, SEM images of which can be seen in FIG. 2. The crystals appeared to be about 4 microns in diameter, and the crystal morphologies appeared to be fairly uniform. However, the crystals appeared to contain a few intergrown, polycrystalline aggregates, and the surfaces of the crystals seemed rough.

Example 4

Figure 3:
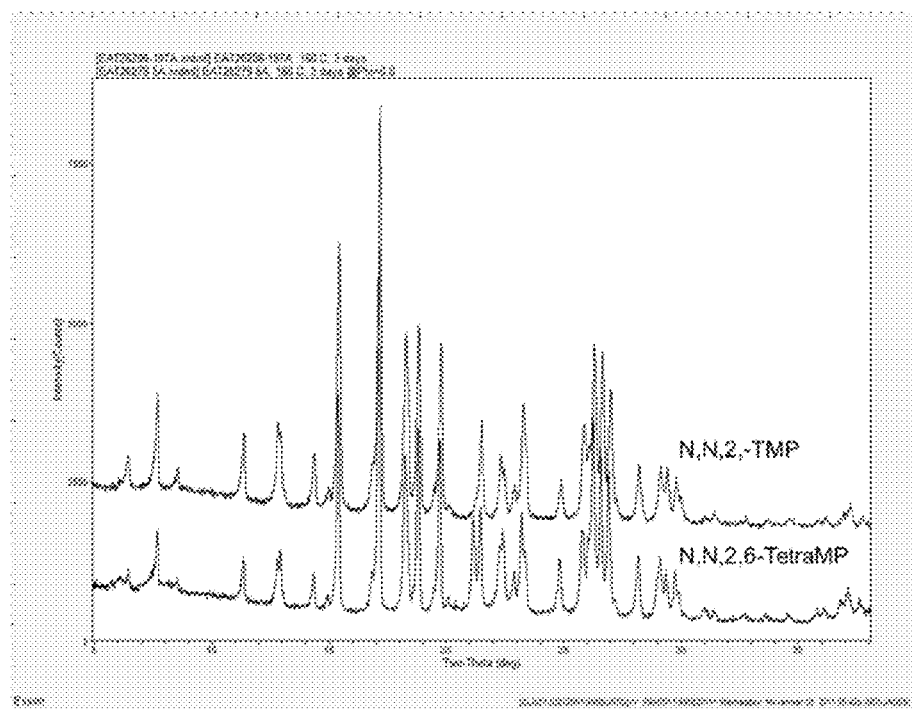
FIG. 3 compares the powder X-ray diffraction (XRD) patterns of the products of Examples 2 and 4.

The synthesis of Example 2 was repeated with 2,6,N,N-tetramethylpiperidinium hydroxide as the structure directing agent, Q, and with the NaCl/Si ratio being ~0.1:1. Heating for ~3 days at ~160° C. appeared to yield a product containing a DDR-type material and an impurity phase. FIG. 3 compares the powder XRD patterns of the products of Examples 2 and 4 using the two different SDA molecules. There appeared to be a minor impurity phase in the product of Example 4, as indicated by extra features/peaks centered around ~6.1 degrees 2-theta and a more intense peak at ~21.2 degrees 2-theta.

Figure 4:
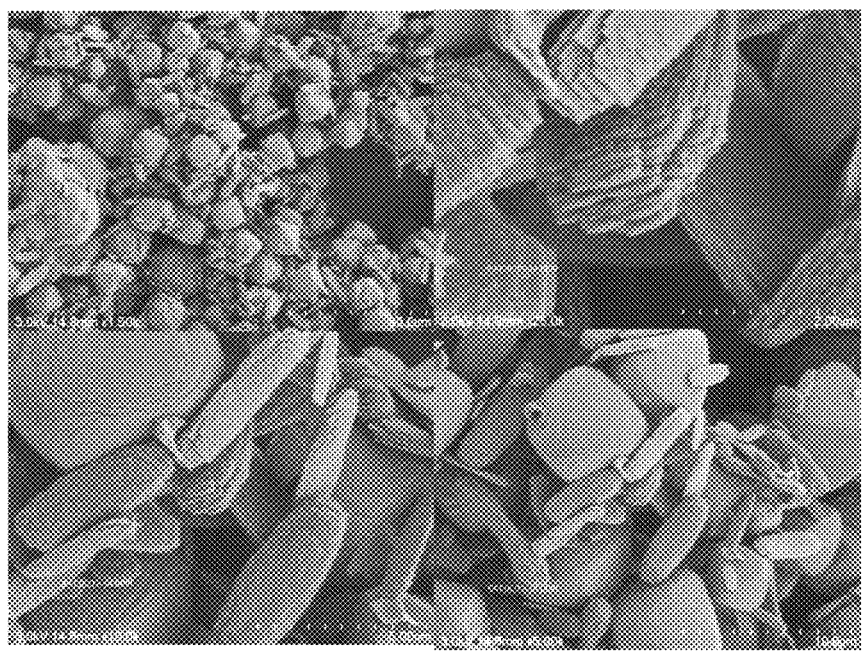
FIGS. 4-8 show SEM images of the products of Examples 4-8, respectively.

The SEM of the product of Example 4 can be seen in FIG. 4 and seemed to reveal an extra phase appearing to be quite prevalent. When higher concentrations of sodium were used a synthesis modeled upon Example 4, the selectivity appeared to shift to the impurity phase, which was later determined to be SSZ-43, a one-dimensional, 12-ring zeolite related to SSZ-31.

Example 5

Figure 5:
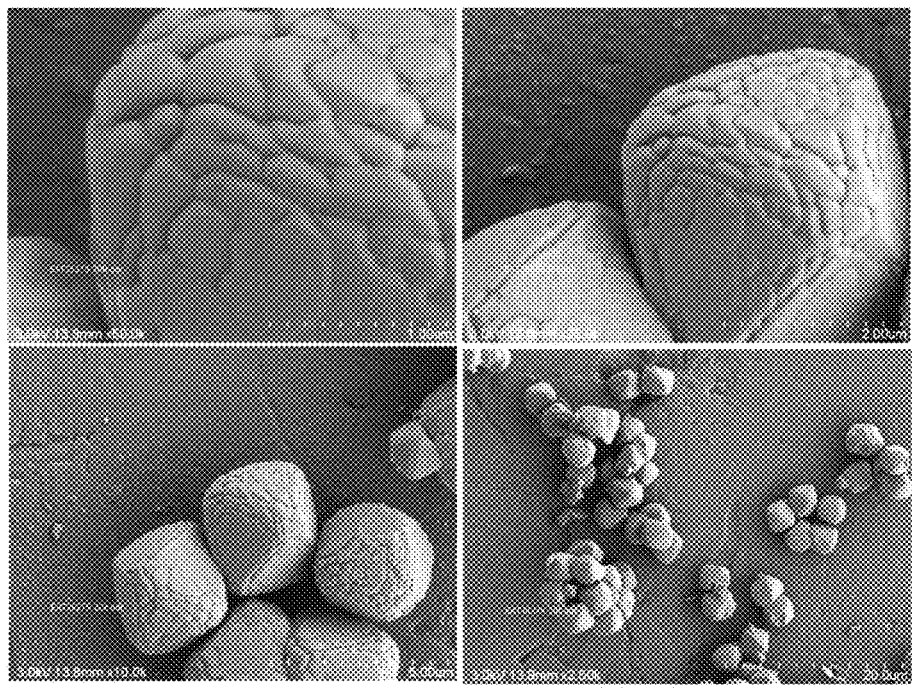

The process of Example 4 was repeated but with no intentionally added alkali metal present. After ~4 days at ~160° C., a substantially pure DDR product was obtained, which SEM images can be seen in FIG. 5. The crystals appeared about 3-4 microns in diameter, and the crystal morphologies appeared to be fairly uniform. However, the crystals again appeared to contain a few intergrown, polycrystalline aggregates, and the surfaces of the crystals seemed rough.

Examples 6-7

Figure 6:
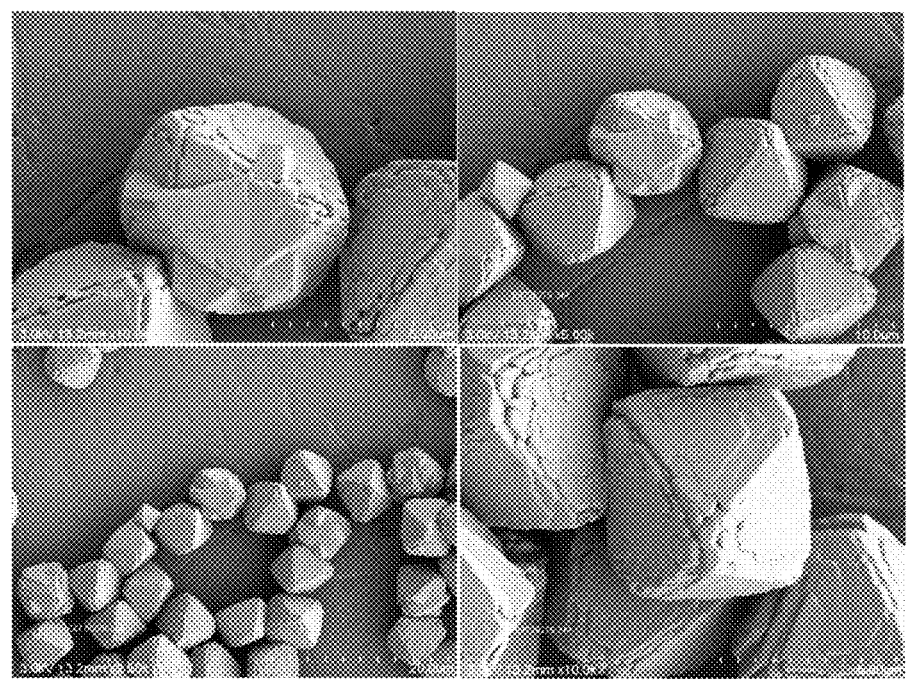
Figure 7:
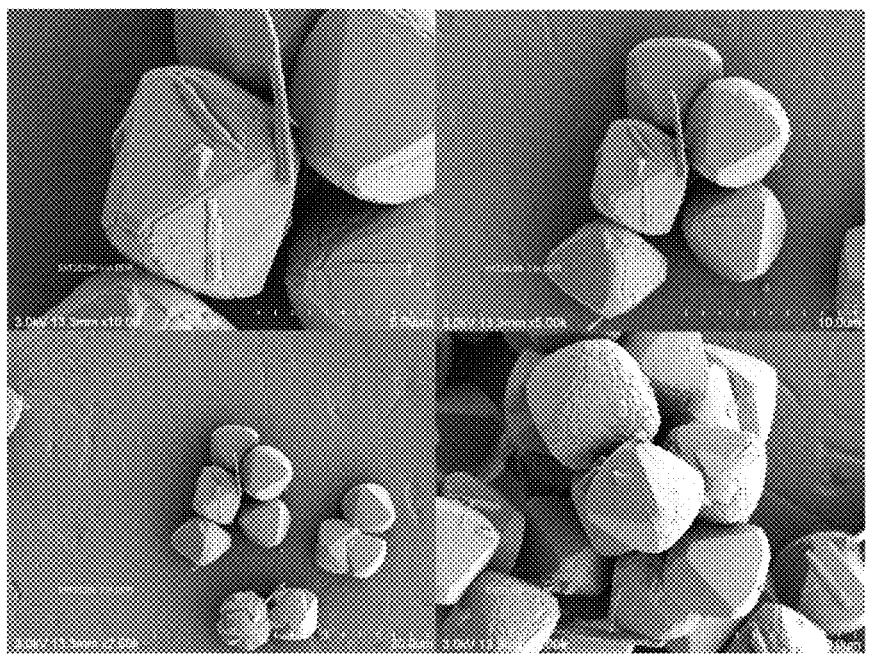

The syntheses of Examples 3 and 5 were repeated for ~2 days at ~175° C. and again DDR products were obtained. FIG. 6 shows the SEM image of the product of Example 6 using 2,N,N-trimethylpiperidinium hydroxide as the structure directing agent, while FIG. 7 shows the SEM image of the product of Example 7 using 2,6,N,N-tetramethylpiperidinium hydroxide as the structure directing agent. In both cases, the crystals appeared to be ~5-7 microns in size, and the crystal facets appeared to have annealed although they did not appear to be completely smooth. It was interesting to note that, within the same crystals, some of the facets appeared to be completely smooth while others appeared to remain rough. It is believed that the thin laths in FIG. 7 were crystals of SSZ-43, the same phase was observed in FIG. 4.

Examples 8-9

Figure 8:
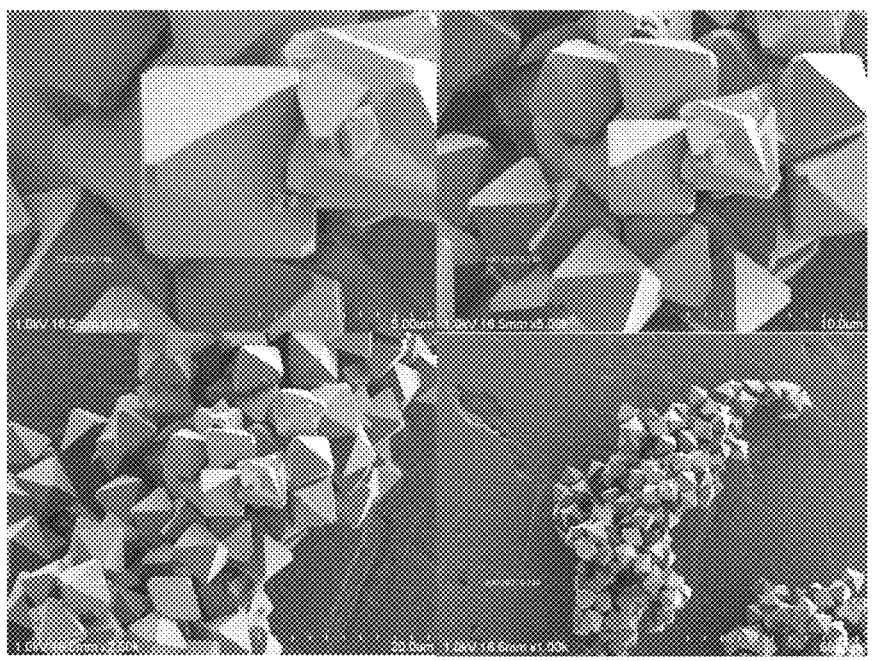

The syntheses of Examples 3 and 5 were repeated for ~1 day at ~200° C. With 2,N,N-trimethylpiperidinium hydroxide (Example 8) as the structure directing agent, a substantially pure DDR product was obtained. The SEM images in FIG. 8 seem to show rather smooth crystal facets, and the pseudo-octahedral crystals appeared to be highly uniform in size with dimensions of ~5-7 microns. With 2,6,N,N-tetramethylpiperidinium hydroxide (Example 9) as the structure directing agent, the product appeared to be a DOH-type phase, a common competing phase with DDR.

Examples 10-12

Figure 9:
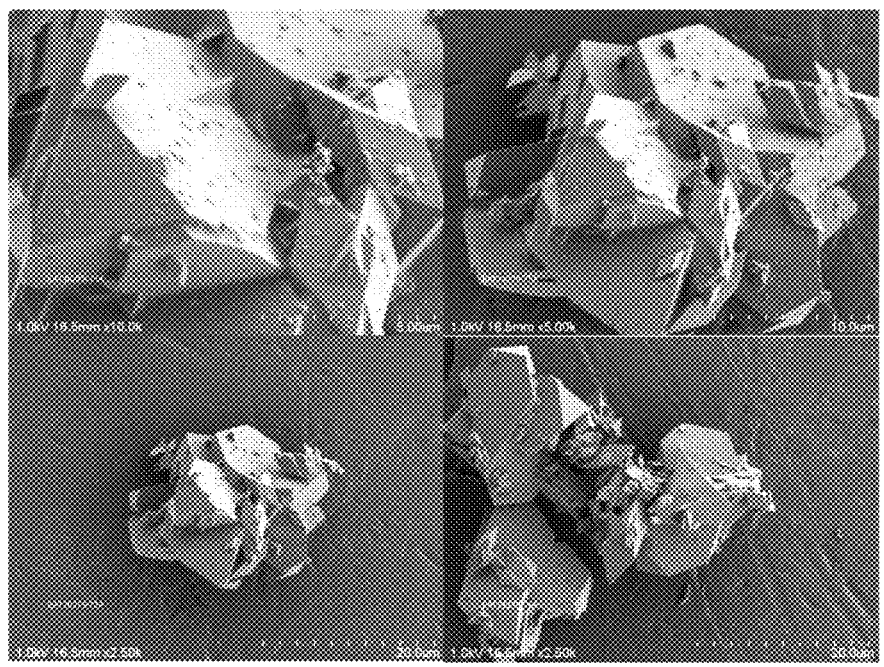
FIGS. 9-13 show SEM images of the products of Examples 10-14, respectively.

The synthesis of Example 8 was repeated but with the $H_2O$/Si ratio being increased from ~30 to ~48 (Example 10). SEM images of the resultant product were provided in FIG. 9 and appeared to show larger, but highly intergrown, crystals with a notably wider size distribution. Also the crystal morphologies appeared to be more prismatic as opposed to pseudo-octahedral.

Figure 10:
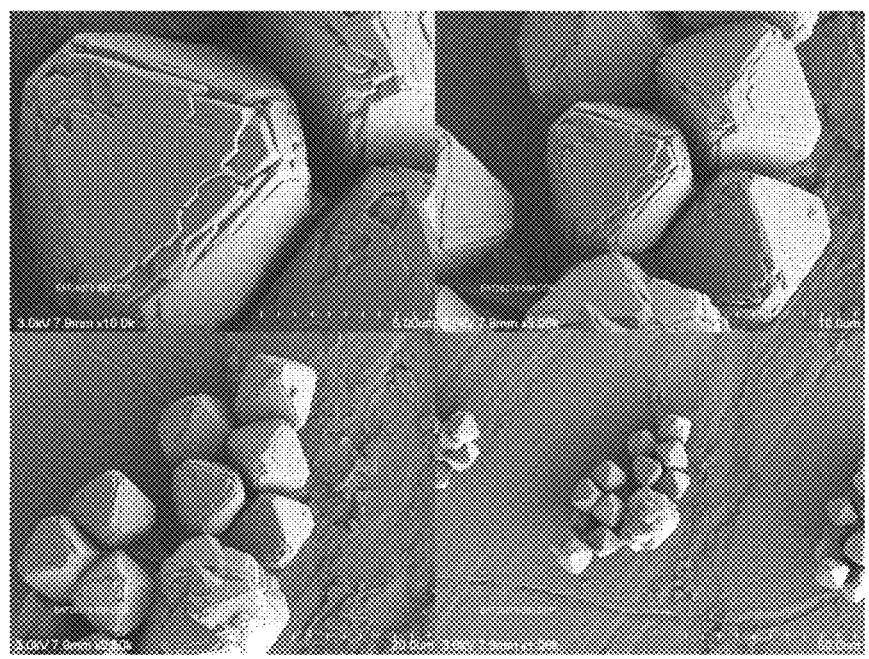
Figure 11:
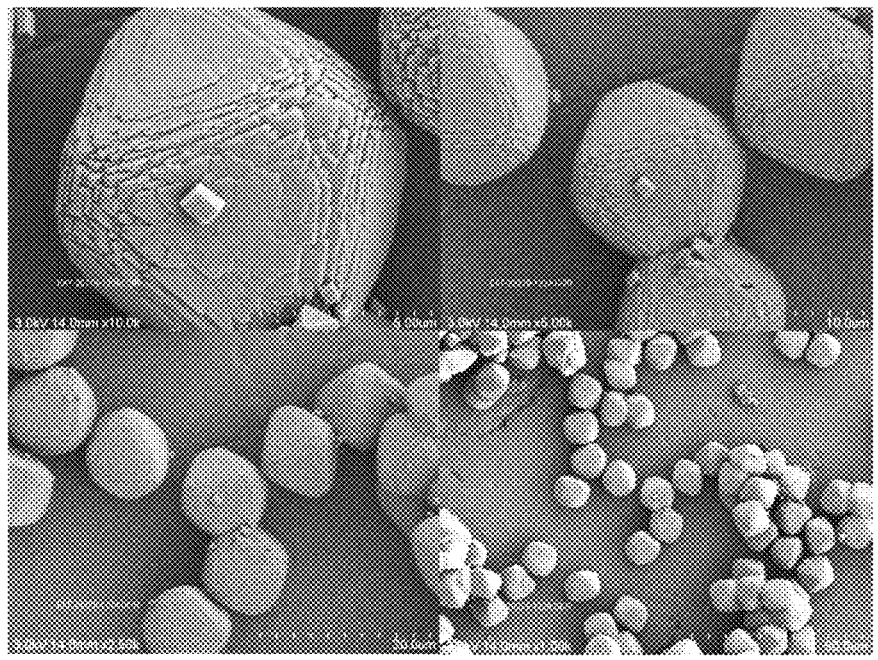

In contrast, when the synthesis of Example 8 was repeated but with the $H_2O$/Si ratio being decreased from ~30 to ~16 (Example 11) and from ~30 to ~8 (Example 12), the crystal morphologies again appeared to be uniform (FIGS. 10 and 11, respectively). The pseudo-octahedral crystals of FIG. 10 appeared to be ~6-8 microns in size. Those in FIG. 11 appeared to be ~8-10 microns in size.

Examples 13-15

Figure 12:
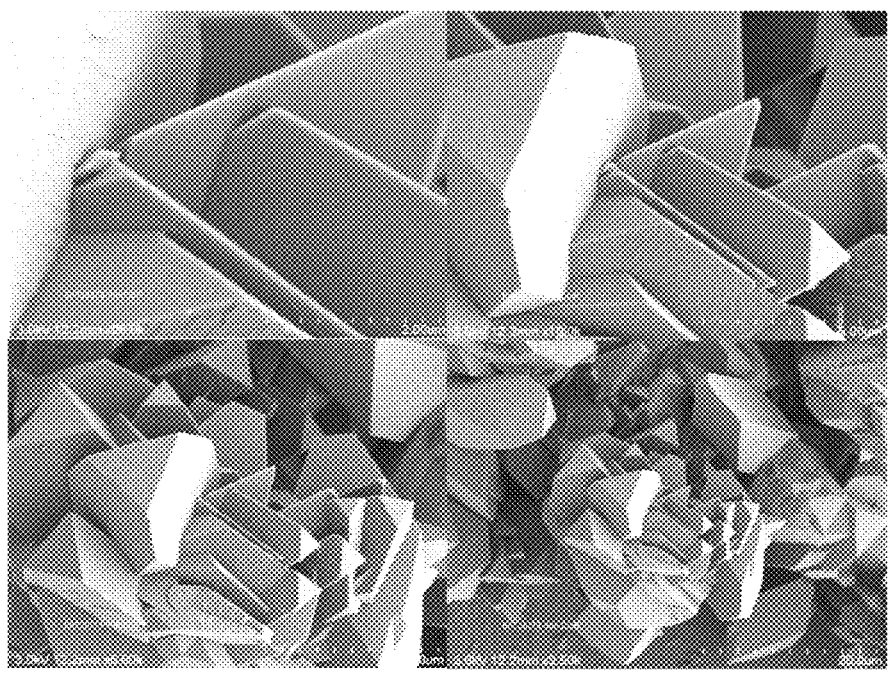

The synthesis of Example 8 was repeated but with the Q/Si ratio being decreased from ~0.25 to ~0.15 (Example 13). As was observed when the $H_2O$/Si ratio was increased in Example 10, many of the crystals appeared large and highly intergrown (see FIG. 12).

Figure 13:
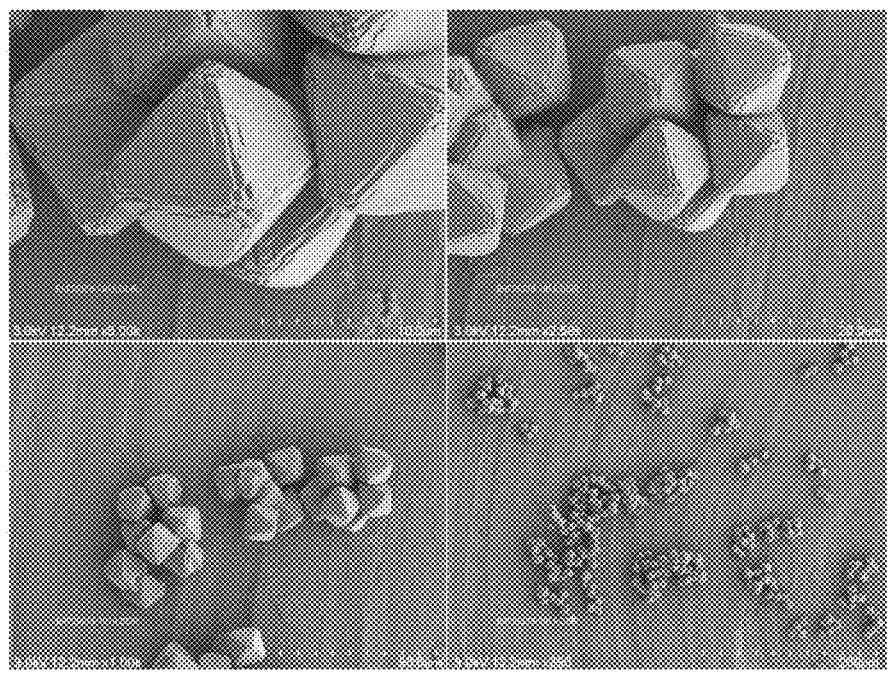

In contrast, when the synthesis of Example 8 was repeated but with the Q/Si ratio being increased from ~0.25 to ~0.5 (Example 14) and from ~0.25 to ~0.75 (Example 15), the crystal uniformity appeared to be maintained. SEM images of the product of Example 14 are shown in FIG. 13.

Example 16

Figure 14:
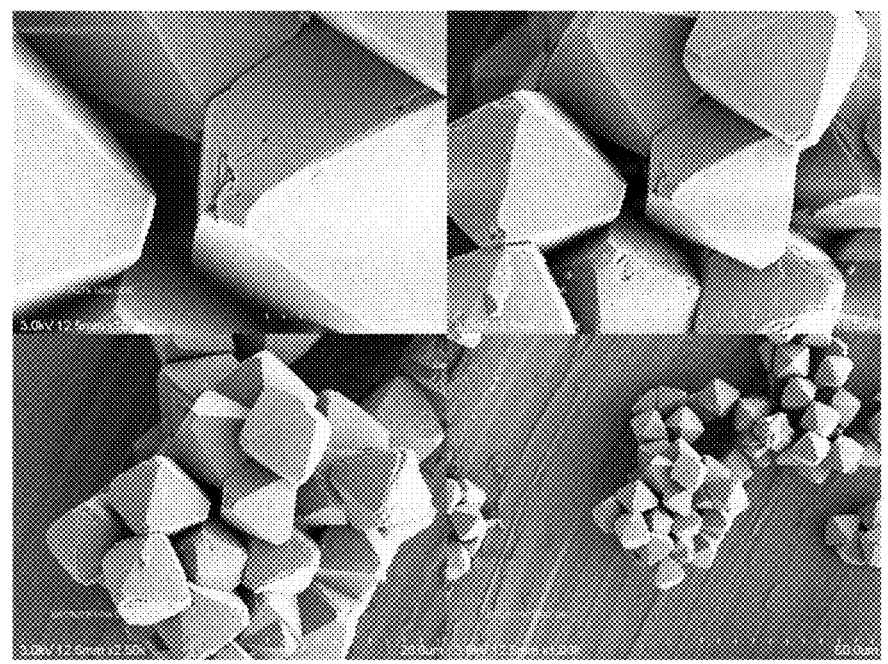
FIGS. 14-22 show SEM images of the products of Examples 16-24, respectively.

The synthesis of Example 13 (Q/Si ratio being ~0.15) was repeated but with less water being added, so that the $H_2O$/Si ratio was ~14 and the $H_2O$/Q ratio was ~90, as compared with ~200 in Example 13. SEM images of the product can be seen in FIG. 14 and appeared to show roughly uniform, pseudo-octahedral crystals of ~8-10 microns in size.

Example 17

Figure 15:
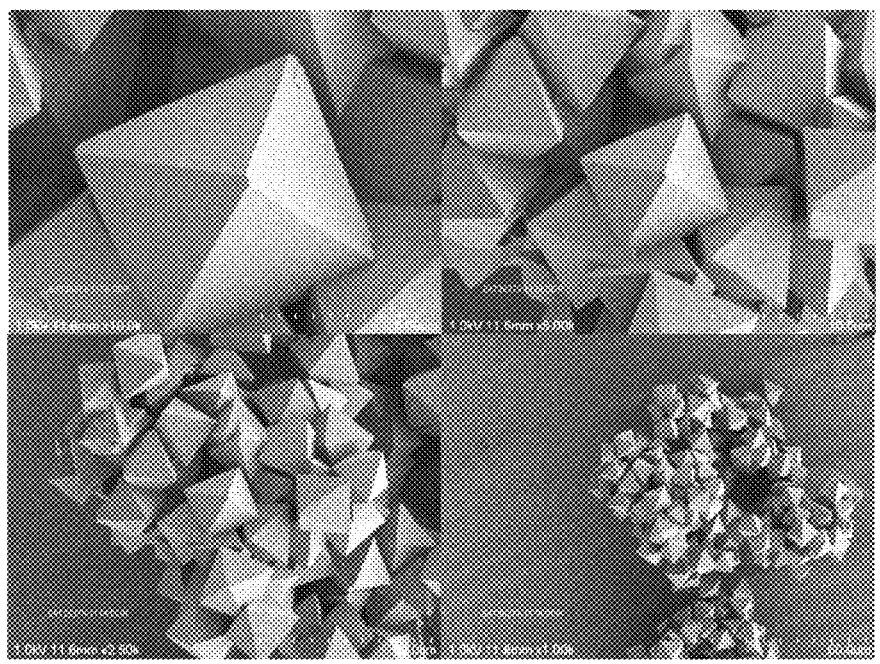

The process of Example 10 ($H_2O$/Si≈50) was repeated but with the Q/Si ratio being increased to ~0.5, such that the $H_2O$/Q was ~100. As shown in FIG. 15, apparently more uniform crystal morphologies (dimensions of ~5-6 microns) were obtained than in Example 10 (see FIG. 9).

Examples 18-21

Examples 18-21 examine the use of N-methyltropinium cations as the structure directing agent (Q). All syntheses were conducted in the absence of intentionally added alkali and alkaline earth metal cations.

Figure 16:
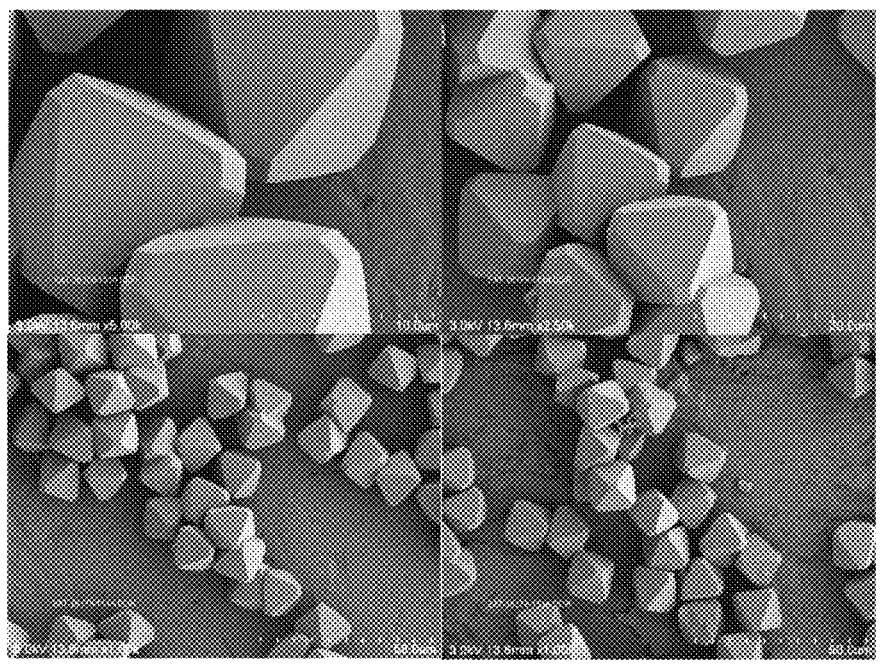

In Example 18, a reaction mixture having a Q/Si≈0.25 and $H_2O$/Si≈30 ($H_2O$/Q≈120) was heated at ~175° C. for ~2 days to produce the DDR-framework type crystals shown in FIG. 16. The morphology of the prismatic crystals appeared highly uniform. The crystals were ~10-15 microns in length and ~7-12 microns in thickness.

Figure 17:
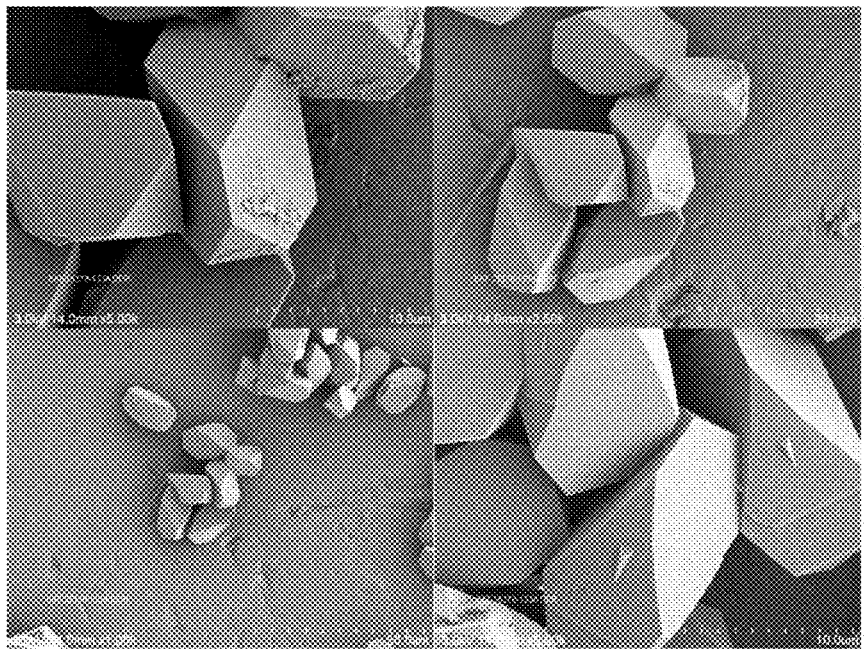

In Example 19, the process of Example 18 was repeated, but with the reaction mixture being heated at ~200° C. for ~1 day. FIG. 17 shows that the crystal morphologies appeared to change quite remarkably. The crystal dimensions along the 3-fold axis appeared to be lengthened, and the uniformity of the crystal dimensions seemed not as good as in FIG. 16. The prismatic crystals appeared to be ~10-15 microns long and ~5-7 microns thick.

Figure 18:
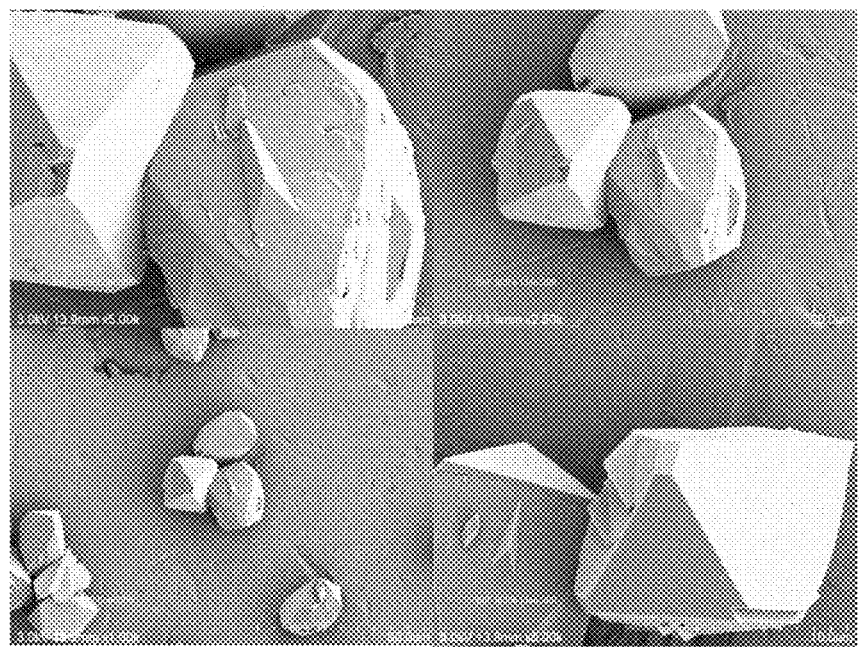

In Example 20, the process of Example 18 was repeated but with the Q/Si ratio being ~0.5 ($H_2O$/Q≈60). SEM images of the product can be seen in FIG. 18. In this case, a larger degree of intergrowth appeared in the crystals, but the thickness of the crystals appeared fairly uniform. The prismatic crystals appeared to be ~15-20 microns long and ~5-10 microns thick.

Figure 19:
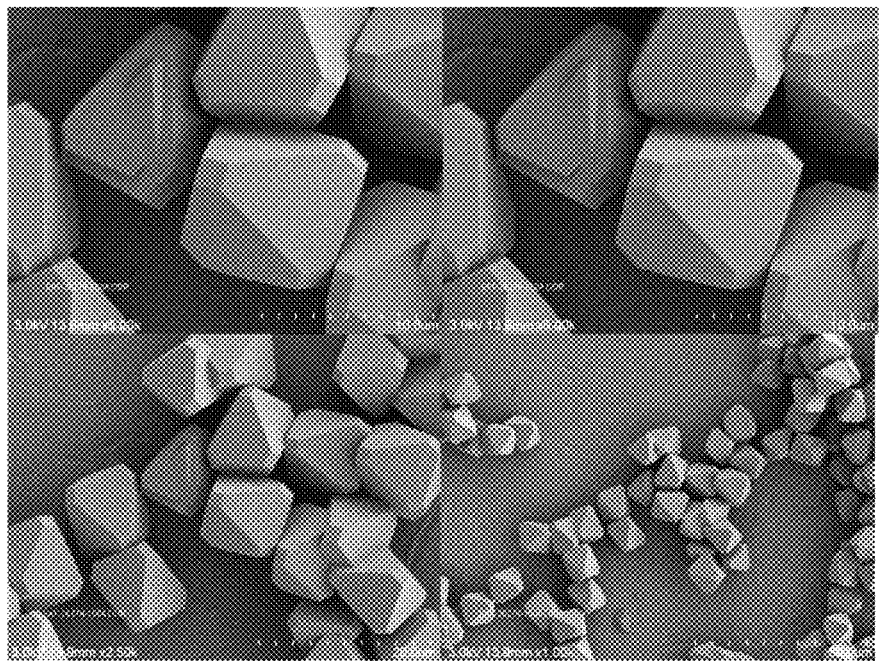

In Example 21, the process of Example 18 was repeated but with less water being added, so as to reduce $H_2O$/Si from ~30 to ~17 ($H_2O$/Q≈68). FIG. 19 shows that the crystals from this synthesis appeared fairly uniform, appeared to be ~9-12 microns long, and appeared to be ~5-8 microns thick.

Examples 22-23

Examples 22 and 23 examine the use of organic amines in addition to the structure directing agent to control crystal morphology in DDR synthesis.

Figure 20:
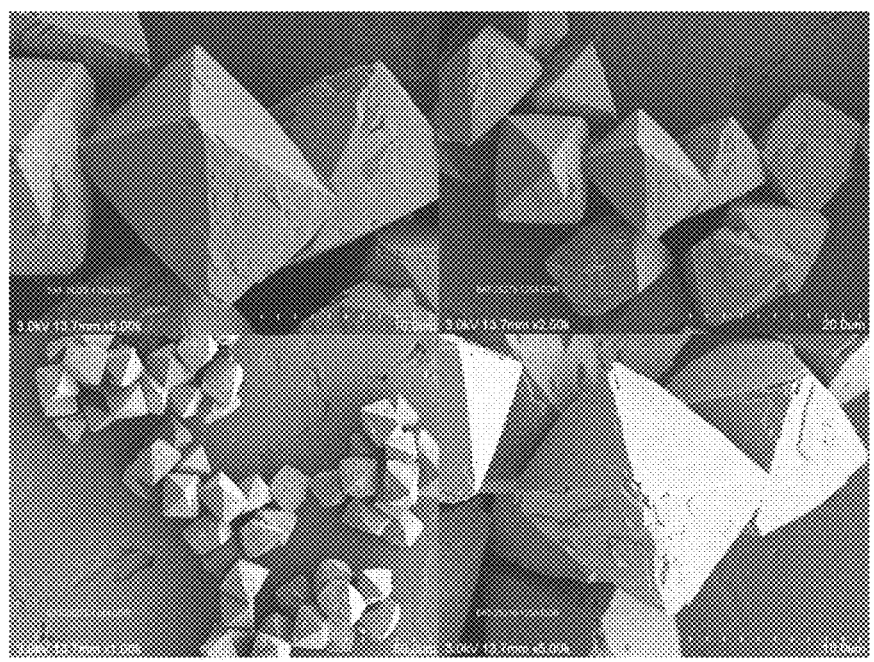
Figure 21:
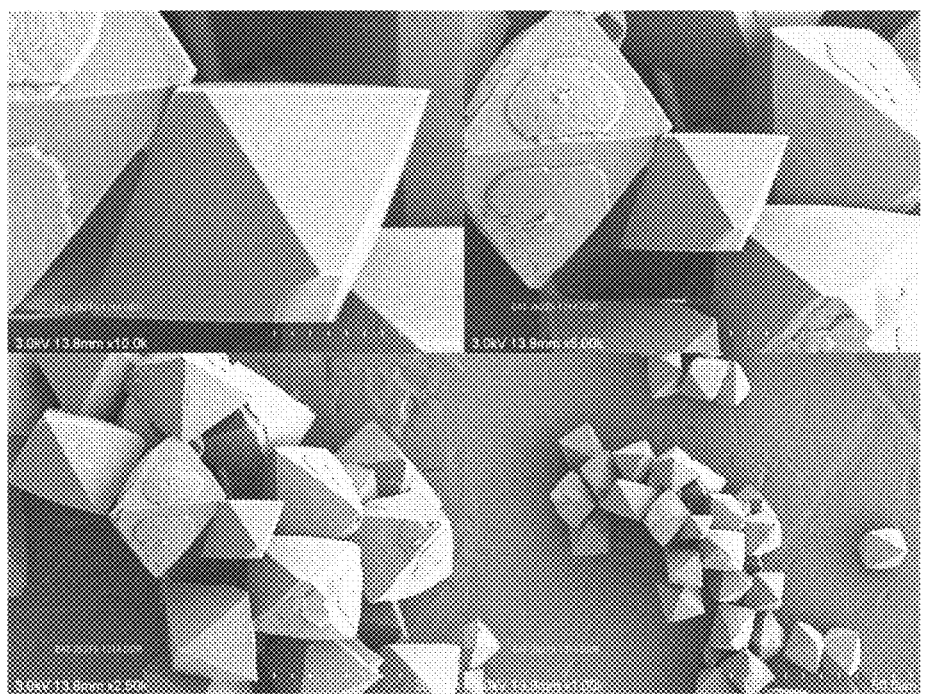

In this examination, the process of Example 8 was repeated but with ethylenediamine (Example 22) and triethanolamine (Example 23) being added to the reaction mixture in a 1:1 molar ratio with the 2,N,N-trimethylpiperidinium hydroxide structure directing agent. FIGS. 20 and 21 show SEM images of the DDR products obtained and appeared to show that, in these crystals, the dimensions along the 3-fold axis of symmetry seemed to have been elongated relative to the crystals of FIG. 8.

Example 24

Figure 22:
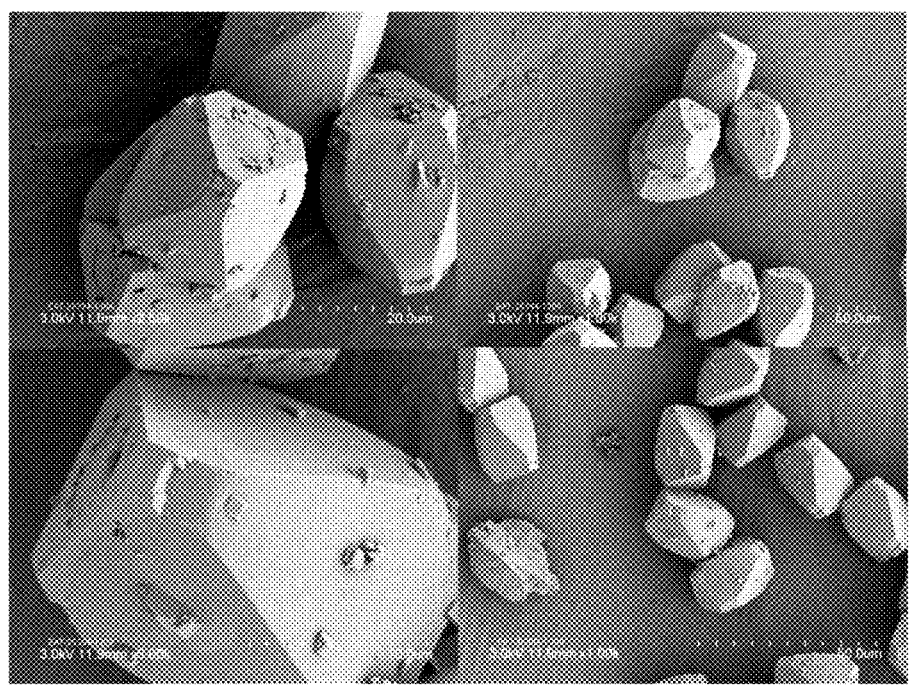

A zeolite gel with Si/B≈30 was prepared as follows. To a ~23-ml Teflon™ liner was added ~3.26 g of a ~20% aqueous solution of N-methyltropinium, ~3.39 g of deionized water, and ~0.031 g boric acid. Next ~3.0 g Ludox™ LS-30 (~30% colloidal silica suspension) was mixed into the solution to create a uniform suspension. About 0.01 g of all-silica DDR seeds were added to the mixture. The Teflon™ liner was then capped and sealed inside a steel Parr autoclave. The autoclave was then placed in a spit within an oven at ~200° C. under tumbling conditions (~30 rpm) for ~2 days. The solids were then isolated by filtering through a Buchner funnel, washing exhaustively with deionized water, and drying in an oven at ~100° C. After workup of the solid product, powder XRD showed it to be a substantially pure DDR-type zeolite. FIG. 22 shows SEM images of the crystalline product. The crystals appeared to be predominantly ~20±~4 microns in length and ~5-7 microns in thickness. Smaller crystals were observed to speckle the outer surfaces of the large ones, but these were determined to compose less than 7% of the bulk.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A process for synthesizing a DDR framework-type molecular sieve, the process comprising.
   (a) forming a reaction mixture capable of forming the molecular sieve, the mixture comprising water, a source of silicon, and a structure directing agent, Q, selected from the group consisting of a methyltropinium salt, a 2,6,N,N-tetramethylpiperidinium salt, a 2,N,N-trimethylpiperidinium salt and mixtures thereof, wherein the reaction mixture has a molar ratio of water to silicon from 5:1 to 80:1 and a molar ratio of alkali or alkaline earth metal, M, to silicon less than 0.01:1;
   (b) heating said reaction mixture under conditions effective to produce crystals of the DDR framework-type molecular sieve; and
   (c) recovering crystals of the DDR framework-type molecular sieve produced in (b).

2. The process of claim 1, wherein the molar ratio of water to silicon in the reaction mixture is from 5:1 to 70:1.

3. The process of claim 1, wherein the molar ratio of water to silicon in the reaction mixture is from 5:1 to 60:1.

4. The process of claim 1, wherein the molar ratio of water to structure directing agent, Q, in the reaction mixture is from 20:1 to 150:1.

5. The process of claim 1, wherein the molar ratio of structure directing agent, Q, to silicon in the reaction mixture is at least 0.1:1.

6. The process of claim 1, wherein the reaction mixture further comprises a source of boron.

7. The process of claim 6, wherein the reaction mixture has a molar ratio of silica to boron oxide greater than 0.06:1.

8. The process of claim 1, wherein the reaction mixture has a silica to alumina molar ratio of greater than 150.

9. The process of claim 1, wherein the source of silicon comprises colloidal silica.

10. The process of claim 1, wherein the reaction mixture further comprises seeds of a crystalline material comprising a DDR framework-type molecular sieve.

11. The process of claim 1, wherein the reaction mixture further comprises up to 10 wt %, based on the total weight of silicon as silica in the reaction mixture, of seeds of a crystalline material comprising a DDR framework-type molecular sieve.

12. The process of claim 1, wherein the reaction mixture further comprises an amine selected from the group consisting of diethanolamine, triethanolamine, ethylenediamine, diethylenetriamine, and mixtures thereof.

13. The process of claim 12, wherein the molar ratio of amine to structure directing agent in the reaction mixture is from 0.15:1 to 3:1.

14. The process of claim 1, wherein the heating is conducted at a temperature from 120° C. to 205° C.

* * * * *